United States Patent
Schendel

(10) Patent No.: US 8,095,885 B1
(45) Date of Patent: Jan. 10, 2012

(54) COUNTING REFERENCES TO IMAGES DISPLAYED IN MULTIPLE VIEWS

(75) Inventor: Claire Elise Kahan Schendel, Petaluma, CA (US)

(73) Assignee: Adobe Systems Incorporated, San Jose, CA (US)

( * ) Notice: Subject to any disclaimer, the term of this patent is extended or adjusted under 35 U.S.C. 154(b) by 961 days.

(21) Appl. No.: 12/053,942

(22) Filed: Mar. 24, 2008

(51) Int. Cl.
*G09G 5/36* (2006.01)
*G06F 3/048* (2006.01)

(52) U.S. Cl. ........ 715/781; 715/735; 715/806; 715/803; 345/557

(58) Field of Classification Search .................. 715/781, 715/735, 806, 803; 345/557
See application file for complete search history.

(56) References Cited

U.S. PATENT DOCUMENTS

| | | | |
|---|---|---|---|
| 5,263,136 A * | 11/1993 | DeAguiar et al. | 345/538 |
| 7,155,517 B1 * | 12/2006 | Koponen et al. | 709/227 |
| 7,660,950 B2 * | 2/2010 | Miller et al. | 711/133 |
| 2002/0087590 A1 * | 7/2002 | Bacon et al. | 707/206 |
| 2003/0217118 A1 * | 11/2003 | Kobayashi et al. | 709/218 |
| 2005/0149866 A1 * | 7/2005 | Labelle | 715/530 |
| 2008/0059886 A1 * | 3/2008 | Grossman | 715/733 |
| 2008/0155472 A1 * | 6/2008 | Runge et al. | 715/811 |

* cited by examiner

*Primary Examiner* — Michael Roswell
(74) *Attorney, Agent, or Firm* — Kilpatrick Townsend & Stockton LLP

(57) ABSTRACT

Methods and apparatus provide for a Cache Manager to display a scaled image in an active view. The scaled image comprises the same content as an image from a stored collection of images, which is accessible by a plurality of active views in a user interface. The Cache Manager refreshes the active view to replace the displayed scaled image with a larger-sized image, which comprises the same content as the displayed scaled image. A reference counter associated with the larger-sized image is maintained to keep track of instances of display of the larger-sized image by any of the plurality of active views. The Cache Manager allows any other active view to use the larger-sized image while a current value of the reference counter is greater than zero.

20 Claims, 15 Drawing Sheets

COUNTING REFERENCES TO IMAGES DISPLAYED IN MULTIPLE VIEWS

BACKGROUND

A cache is a stored collection of duplicate data where the original data is too expensive to fetch or to compute in comparison to the cost of reading the cache. In other words, a cache is a temporary storage area where frequently accessed data can be stored for rapid access. Once the data is stored in the cache, future use of the cached data can be made by accessing the cache rather than re-fetching or recomputing the original data. Hence, average access time is shorter. Caches, therefore, help expedite data access. When a cache client (i.e. a CPU, web browser, operating system) wishes to access original data, it first checks the cache. If data can be found in the cache that is a copy of the original data, then the cache data in the entry is used instead. This situation is known as a cache hit.

SUMMARY

Conventional systems suffer from a variety of deficiencies. For example, conventional systems usually store images at small sizes to be accessed and displayed when a user scrolls through images in a graphical user interface. Storing such small-sized images allows for rendering the images quickly. If the user wants to view images in a larger size, the larger-sized version is fetched. When the larger image is fetched, it is also stored.

Conventional systems usually store the images in memory that allows a maximum amount of stored image data. When the maximum amount is reached, conventional systems begin to free (i.e. delete) the images based on their time stamps, which reflect the last time each image was accessed.

Managing time stamps in conventional systems is deficient because it creates processing overhead. For example, conventional systems must continually monitor the current amount of image data in memory. When the maximum amount is reached, the conventional systems must perform a search or sort algorithm on the time stamps in order to organize or identify the stored images according to their time stamps.

Techniques discussed herein significantly overcome the deficiencies of conventional systems such as those discussed above as well as additional techniques also known in the prior art. As will be discussed further, certain specific embodiments herein are directed to a Cache Manager. The one or more embodiments of the Cache Manager as described herein contrast with conventional systems to allow for storing a reference to a stored image currently displayed in an active view. When the active view terminates display of the image, the reference is deleted and the image is removed from local storage (e.g. cache). However, while the reference exists in local storage, other active views can utilize the same locally stored image. Hence, the Cache Manager allows for multiple active views to access the locally stored image while avoiding the processing costs associated with managing time stamps.

During an example operation of one embodiment, the Cache Manager locally stores a collection of images that can be displayed and organized in a plurality of active views in a user interface, such as a browser. Each image in the collection of images has a size of 64×64 pixels. However, it is understood that the images in the collection of images can be of any size.

The user interface allows a user to search and view the collection of images in a first active view in a browser. For example, the first active view accesses the locally stored collection of images to display some of the images, such as images A, B, C, and D. The first active view allows the user to view a larger-sized version of image D by selecting (i.e. clicking on) image D as it is displayed in the browser. However, a larger-sized version of image D is not locally stored. Thus, the Cache Manager requests a larger-sized version of image D from an image repository.

As the Cache Manager waits for receipt of the larger-sized version of image D, it again accesses image D from locally stored collection of images and expands it to create a scaled version of image D. The Cache Manager displays the scaled version of image D along with the four images already displayed in the first active view. It is understood that since the scaled version of image D is an expanded copy of image D, it shows the content of image D at a low resolution.

When the larger-sized version of image D is received, the larger-sized version of image D is locally stored and a reference counter is incremented to a value of 1. The reference counter is associated with image D and keeps track of a number of instances of display of the larger-sized version of image D by any active view. The Cache Manager refreshes the first active view to display the larger-sized version of image D in place of the scaled version of image D. Thus, the first active view concurrently displays the larger-sized version of image D along with the 64×64 pixels sized images A, B, C and D.

The Cache Manager allows the user to view images A, B, C and D in a second active view that requires display each of the four images in a larger size. However, rather than experiencing the processing, storage and time cost of obtaining a second copy of the larger-sized version of image D from the image repository, the Cache Manager allows the second active view to use the larger-sized version of image D already in local storage if the reference counter associated with image D is greater than zero.

To generate the second active view, the first active view is hidden. However, although the first active view is hidden, it is still "using" the larger-sized version of image D. Thus, the reference counter associated with the larger-sized version of image D maintains its current value of 1. As long as the reference counter associated with the larger-sized version of image D is greater than zero, the second active view can use the larger-sized version of image D.

When the second active view displays the larger-sized version of image D, the reference counter associated with the larger-sized version of image D is incremented to a current value of 2. Thus, the reference counter for the larger-sized version of image D reflects that two active views (i.e. the hidden first active view and the second active view) are displaying the larger-sized version of image D. However, the Cache Manager still has to make a request for the larger-sized versions of images A, B and C from the image repository.

As the Cache Manager waits for the larger-sized versions of images A, B and C, it expands the 64×64 pixels size versions of the three images in local storage to produce and concurrently display scaled versions of the three images along with the larger-sized version of image D.

When the larger-sized versions of images A, B and C are received, the larger-sized versions of the three images are locally stored. Each larger-sized version of the three images has a respective reference counter as well. The reference counters are each incremented to a current value of 1. The Cache Manager refreshes the second active view to display the larger-sized versions of images A, B and C in place of the scaled versions of the three images. Again, the larger-sized version of image D has already been in display in the second active view.

Thus, as the second active view displays the four larger sized images to the user, each reference counter associated the larger-sized version of image A, image B and image C has a current value of 1. The reference counter associated with the larger-sized image D has a current value of 2. In addition, local storage still holds the entire collection of images—at the 64×64 pixels size.

Since the reference counter associated with the larger-sized image D has a current value of 2, a third active view will not have to obtain the larger-sized version of image D until that reference counter is decremented to a current value of 0. For example, if the second active view terminates display of the larger-sized version of image D, reference counter associated with the larger-sized image D is decremented to a current value of 1, thereby reflecting that it is still displayed in the hidden first active view. Hence, the third active view can use the larger-sized version of image D that is locally stored.

In another embodiment, when display of a larger-sized image of D is terminated in the second active view, the reference counter associated with the larger-sized version of image D is not immediately decremented. Instead, prior to decrementing the reference counter, the Cache Manager waits for expiration of a period of time after termination of display of the larger-sized image of D. Thus, if the user scrolls through the images in the browser to again view the larger-sized version of image D before expiration of the period of time, the larger-sized image of D can again be displayed in the second active view because the reference counter associated with the larger-sized version of image D will be greater than zero.

In another embodiment, the Cache Manager displays a scaled image in an active view. The scaled image comprises the same content as an image from a stored collection of images, which is accessible by a plurality of active views in a user interface. The Cache Manager refreshes the active view to replace the displayed scaled image with a larger-sized image, which comprises the same content as the displayed scaled image.

A reference counter associated with the larger-sized image is maintained to keep track of instances of display of the larger-sized image by any of the plurality of active views. The Cache Manager allows any other active view to use the larger-sized image while a current value of the reference counter is greater than zero.

In another embodiment, a second active view requires display of a large-sized image that is currently displayed in a first active view (or a hidden first active view). However, the second active view needs an even larger size than the locally stored large-sized image used by the first active view. The Cache Manager expands the locally stored large-sized image to display a scaled version of the locally stored large-sized image in the second active view. The Cache Manager requests the even larger-sized image from an image repository, which is displayed in place of the scaled version of the locally stored large-sized image upon receipt. In local storage (i.e. cache), the Cache Manager replaces the locally stored large-sized image with the even larger-sized image—and the Cache Manager allows the first active view to utilize the even larger-sized image along with the second active view. Thus, a reference counter associated with the locally stored even larger-sized image has a current value of 2 since both the first and second active views are now using the even larger-sized image.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium (e.g., tangible computer-readable medium) including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in software and hardware such as those manufactured by Adobe Systems Incorporated of San Jose, Calif., U.S.A., herein after referred to as Adobe and Adobe Systems.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for a Cache Manager, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

Figure 1:
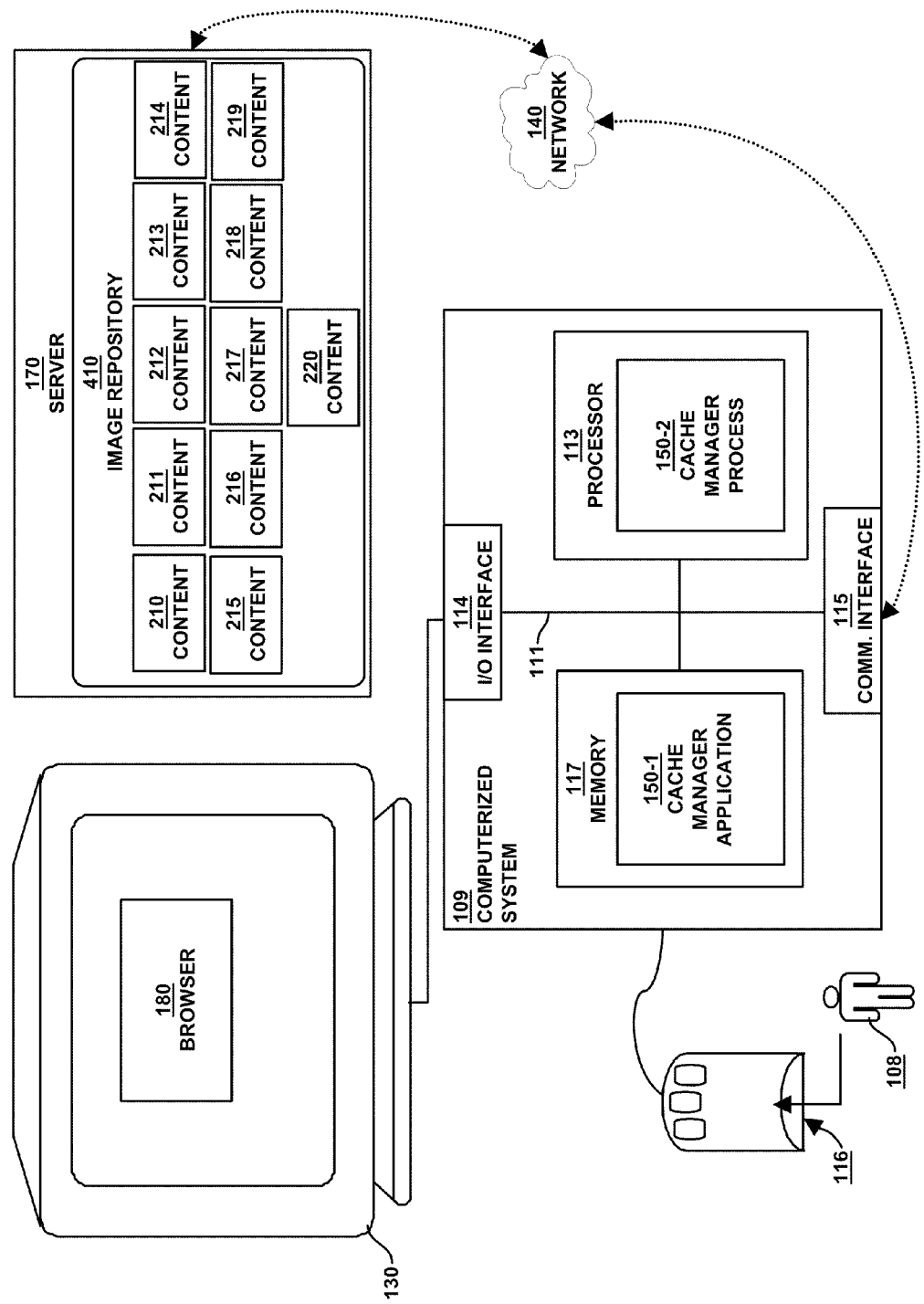
FIG. 1 is an example block diagram illustrating an architecture of a computer system that executes a Cache Manager application and/or a Cache Manager process according to embodiments herein.

FIG. 1 is an example block diagram illustrating an architecture of a computer system 109 that executes, runs, interprets, operates or otherwise performs a Cache Manager application 150-1 and/or Cache Manager process 150-2 (e.g. an executing version of a Cache Manager 150 as controlled or configured by user 108) according to embodiments herein.

Note that the computer system 109 may be any type of computerized device such as a personal computer, a client computer system, workstation, portable computing device, console, laptop, network terminal, etc. This list is not exhaustive and is provided as an example of different possible embodiments.

In addition to a single computer embodiment, computer system 109 can include any number of computer systems in a network environment to carry the embodiments as described herein.

As shown in the present example, the computer system 109 includes an interconnection mechanism 111 such as a data bus, motherboard or other circuitry that couples a memory system 112, a processor 113, an input/output interface 114, and a display 130. If so configured, the display can be used to present a graphical user interface of the Cache Manager 150 to user 108. An input device 116 (e.g., one or more user/developer controlled devices such as a keyboard, mouse, touch pad, etc.) couples to the computer system 109 and processor 113 through an input/output (I/O) interface 114. The computer system 109 can be a client system and/or a server system. As mentioned above, depending on the embodiment, the Cache Manager application 150-1 and/or the Cache Manager process 150-2 can be distributed and executed in multiple nodes in a computer network environment or performed locally on a single computer.

The memory system 112 can be any type of computer readable medium (e.g., tangible computer readable medium) and, in this example, is encoded with a Cache Manager application 150-1 that support.

During operation of the computer system 109, the processor 113 accesses the memory system 112 via the interconnect 111 in order to launch, run, execute, interpret or otherwise perform the logic instructions of the Cache Manager application 150-1. Execution of the Cache Manager application 150-1 in this manner produces the Cache Manager process 150-2. In other words, the Cache Manager process 150-2 represents one or more portions or runtime instances of the Cache Manager application 150-1 (or the entire application 150-1) performing or executing within or upon the processor 113 in the computerized device 109 at runtime.

The Cache Manager application 150-1 may be stored on a computer readable medium (such as a floppy disk), hard disk, electronic, magnetic, optical, or other computer readable medium. It is understood that embodiments and techniques discussed herein are well suited for other applications as well.

Those skilled in the art will understand that the computer system 109 may include other processes and/or software and hardware components, such as an operating system. Display 130 need not be coupled directly to computer system 109. For example, the Cache Manager application 150-1 can be executed on a remotely accessible computerized device via the communication interface 115.

The computer system 109 communicates with a server 170 over a network 140. The server 170 provides access to an image repository 410 that stores image content 210, 211, 212, 213, 214, 215, 216, 217, 218, 219, 220.

Figure 2:
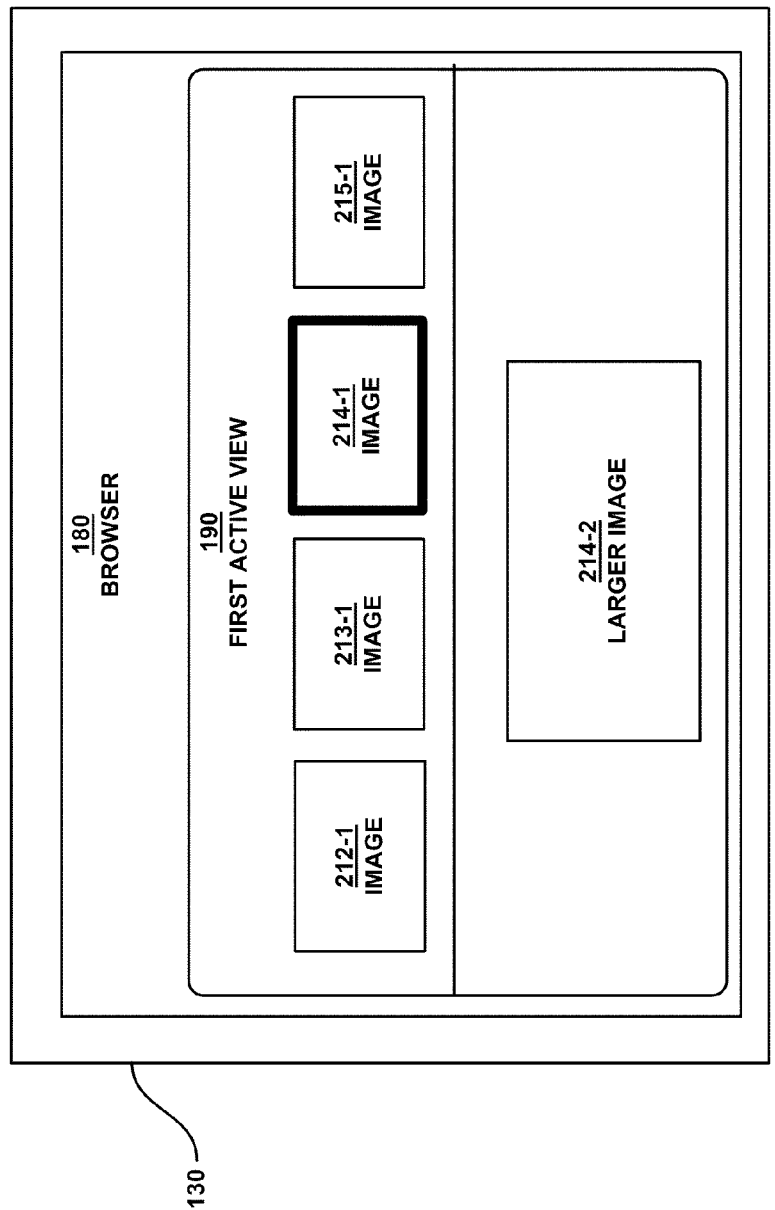
FIG. 2 is an example block diagram of a first active view in a user interface according to embodiments herein.

FIG. 2 is an example block diagram of a first active view 190 in a user interface (such as a browser 180) according to embodiments herein.

The Cache Manager 150 renders the first active view 190, which allows a user to search and view images from a collection of images 210-1, 211-1, 212-1, 213-1, 214-1, 215-1, 216-1, 217-1, 218-1, 219-1, 220-1. The first active view 190 accesses the locally stored collection of images 210-1 . . . 220-1 to display some of the images, such as images 212-1, 213-1, 214-1, 215-1. The first active view 190 allows the user to view a larger-sized version of image 214 by selecting (i.e. clicking on) the image 214-1 as it is displayed in the first active view 190. After the larger-sized version of the selected image 214-2 is received from the image repository 410 and locally stored, the larger-sized version of the selected image 214-2 is concurrently displayed in the first active view 190 along with images 212-1, 213-1, 214-1, 215-1.

Figure 3:
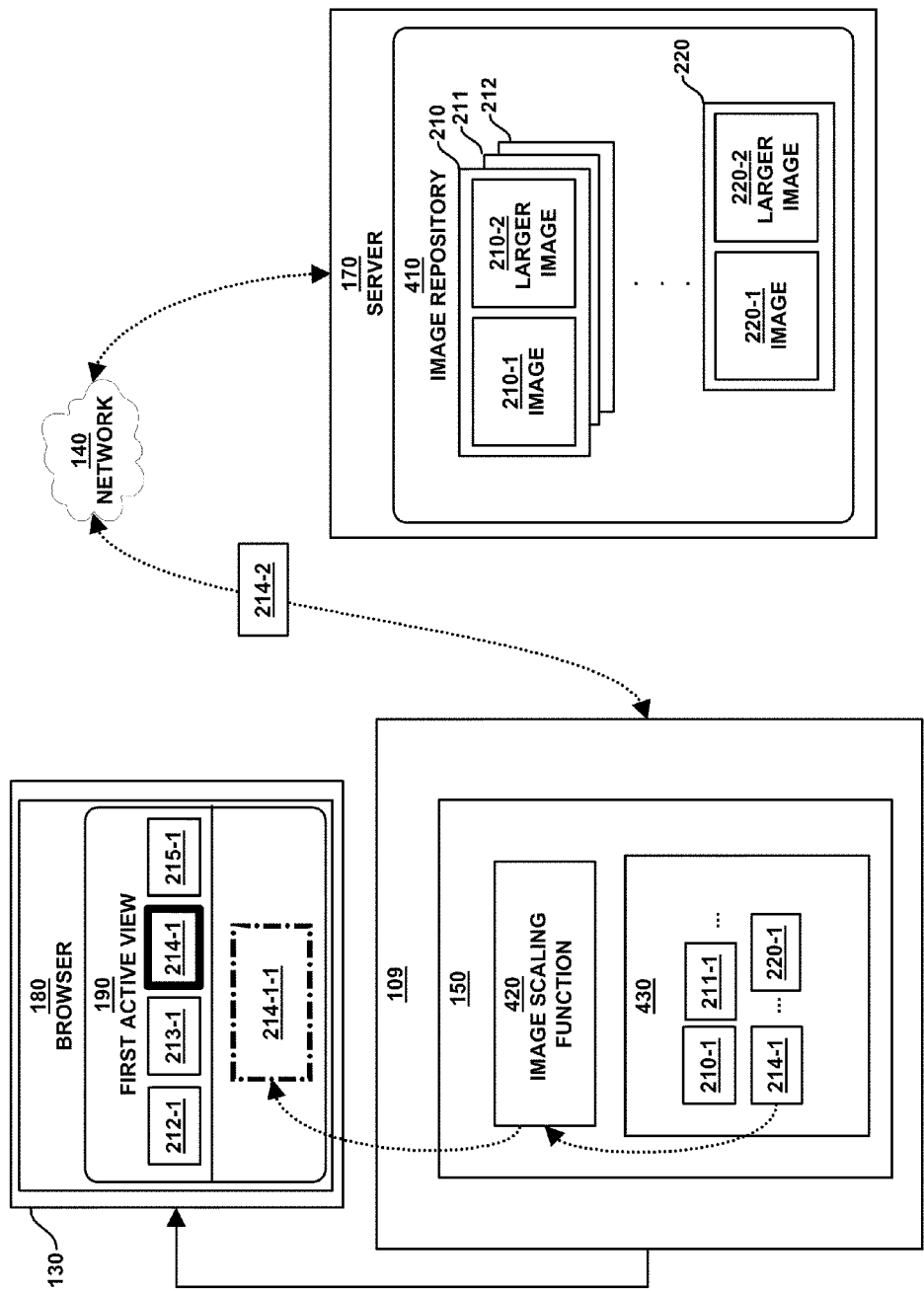
FIG. 3 is an example block diagram of a Cache Manager displaying a scaled image upon selection of an image displayed in the first active view according to embodiments herein.

FIG. 3 is an example block diagram of a Cache Manager 150 displaying a scaled image 214-1-1 upon selection of an image 214-1 displayed in the first active view 190 according to embodiments herein.

The Cache Manager 150 communicates with a server 170, which provides access to the image repository 410. The image repository 410 provides image content 210 . . . 220. The image content 210 . . . 220 includes images in various sizes. For each image 210 . . . 220, the image repository 410 provides two different sizes 210-1, 211-1, 212-1, 213-1, 214-1, 215-1, 216-1, 217-1, 218-1, 219-1, 220-1, 210-2, 211-2, 212-2, 213-2, 214-2, 215-2, 216-2, 217-2, 218-2, 219-2, 220-2. Thus, for example, image 210-1 is a small version of image content 210, and image 210-2 is a larger-sized version of image content 210. It is understood that the image repository 410 is not limited to providing images in only two different sizes.

Upon initialization of the first active view 190, the Cache Manager 150 receives a collection of images 210-1, 211-1, 212-1, 213-1, 214-1, 215-1, 216-1, 217-1, 218-1, 219-1, 220-1 from the image repository 410. The collection of images 210-1 . . . 220-1 is locally stored in a cache 430. Thus, when the Cache Manager 150 displays images 212-1, 213-1, 213-1, 214-1 in the first active view 190, it accesses the cache 430 to retrieve the images 212-1 . . . 214-1 rather than sending additional requests for those images 212-1 . . . 214-1 to the server 170. It is understood that each image from the locally stored collection of images 210-1 . . . 220-1.

The Cache Manager 150 detects selection of image 214-1 in the first active view 190. Such selection is an indication that the user desires to view a larger-sized version of the image 214-2. However, a larger-sized version of the image 214-2 is not locally stored in the cache 430. Thus, the Cache Manager 150 requests the larger-sized version of the image 214-2 from the image repository 410.

As the Cache Manager 150 waits for receipt of the larger-sized version of the image 214-2, it again accesses the version of the image 214-1 that is already in the cache 430. Image 214-1 is again retrieved from the cache 430 and the Cache Manager 150 passes the image 214-1 through an image scaling function 420 in order to expand the image 214-1. Expanding the image 214-1 creates a scaled image 214-1-1. The Cache Manager displays the scaled image 214-1-1 along with the four images 212-1, 213-1, 214-1, 215-1 already displayed in the first active view 190. It is understood that since the scaled image 214-1-1 is an expanded copy of image 214-1, it shows the content 214 of the image 214-1 at a low resolution.

Figure 4:
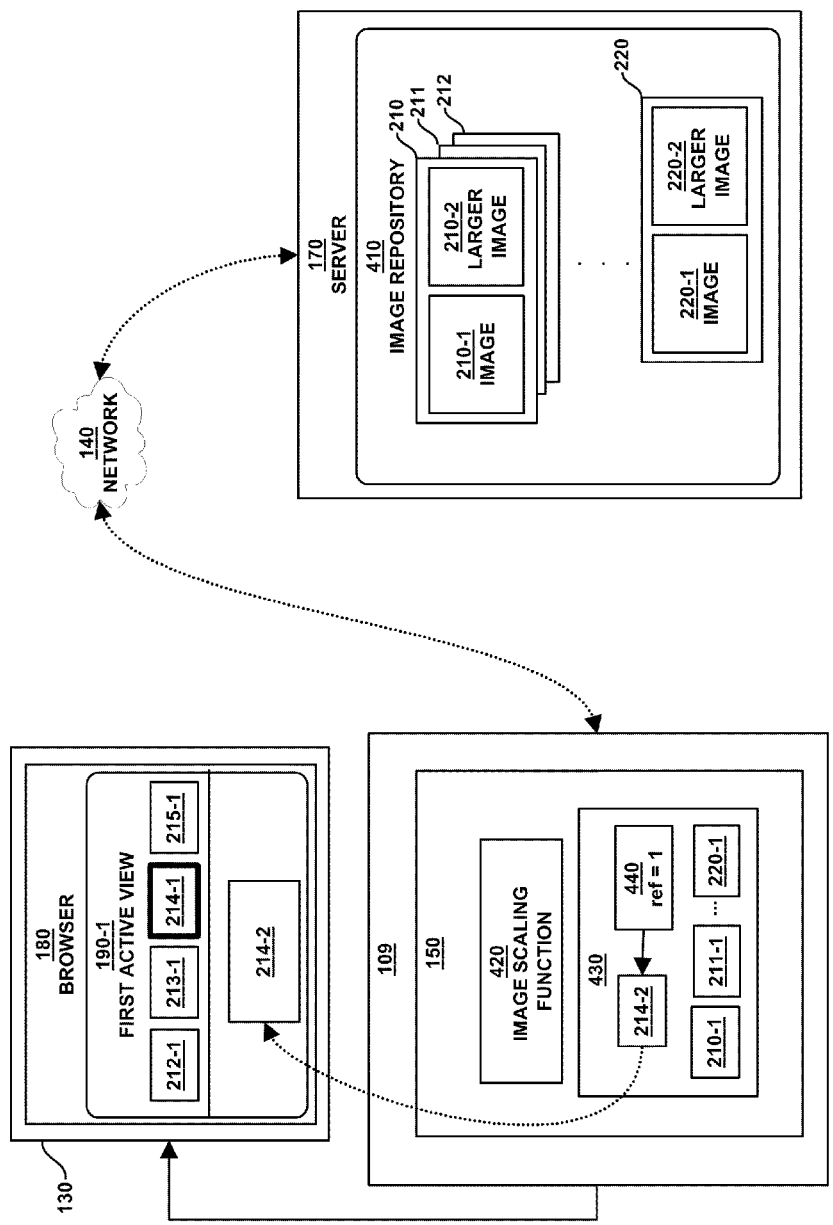
FIG. 4 is an example block diagram of Cache Manager refreshing the first active view to display a larger-sized image in place of the scaled image according to embodiments herein.

FIG. 4 is an example block diagram of Cache Manager 150 refreshing the first active view 190-1 to display a larger-sized image 214-2 in place of the scaled image 214-1-1 according to embodiments herein.

When the larger-sized image 214-2 is received, the Cache Manager 150 stores the larger-sized image 214-2 in the cache 430 and associates a reference counter 440 with the larger-sized image 214-2. The reference counter 440 for the larger-sized image 214-2 keeps track of the number of instances of display of the larger-sized image 214-2 by any active view.

The Cache Manager 150 refreshes the first active view 190-1 to display the larger-sized image 214-2 in place of the scaled image 214-1-1. Thus, the first active view concurrently displays the larger-sized image 214-2 with along with images 212-1, 213-1, 214-1, 215-1.

Since the refreshed first active view 190-1 displays the larger-sized image 214-2, the reference counter 440 is incremented to a current value of 1, thereby representing one instance of display of the larger-sized image 214-2 by an active view.

Figure 5:
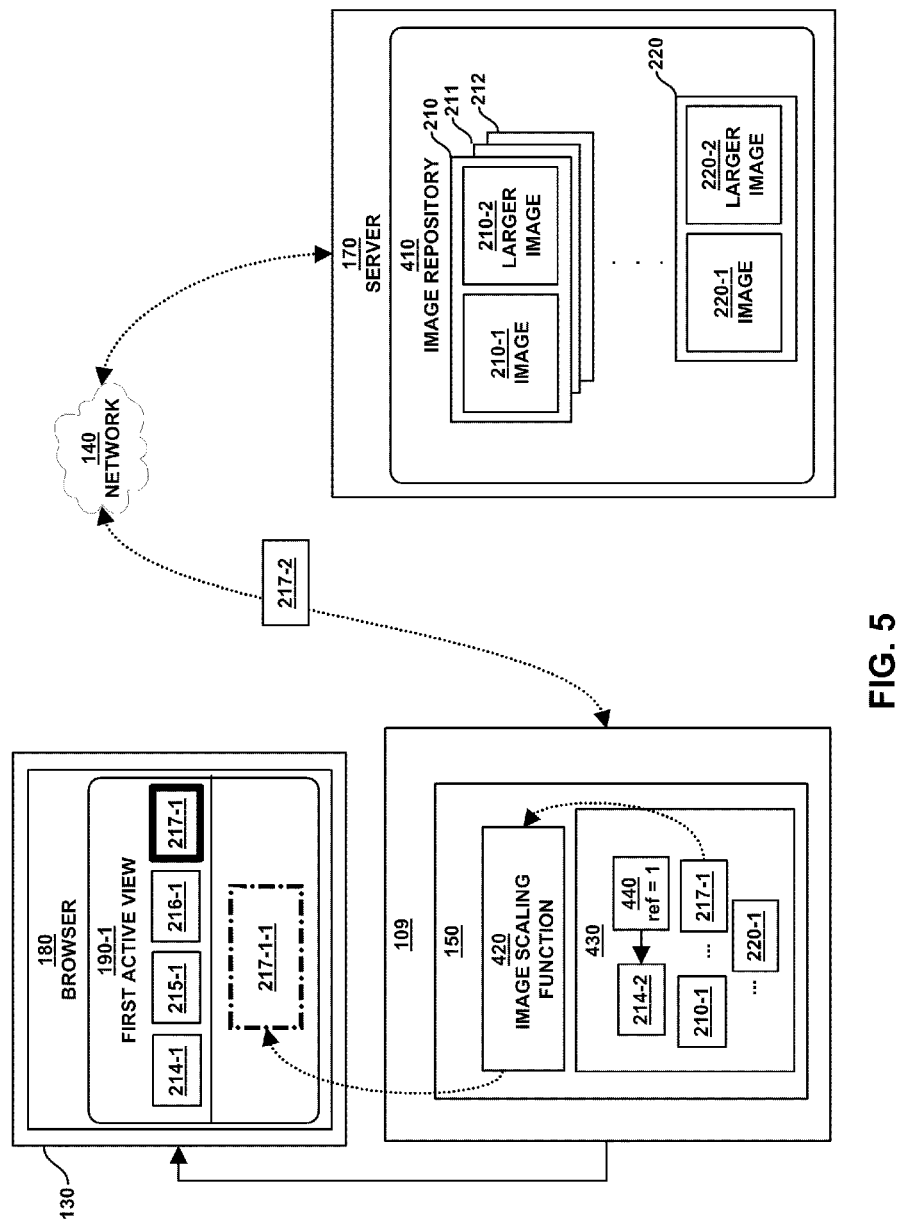
FIG. 5 is an example block diagram of a Cache Manager displaying another scaled image upon selection of another image displayed in the first active view according to embodiments herein.

FIG. 5 is an example block diagram of a Cache Manager 150 displaying another scaled image 217-1-1 upon selection of another image 217-1-displayed in the first active view 190-1 according to embodiments herein.

The first active view 190-1 allows the user to scroll through and view other images 216-1, 217-1 from the locally stored collection of images 210-1 . . . 220-1. Thus, display of images 212-1 and 213-1 is terminated in the first active view 190-1.

To displays the other images 216-1, 217-1 in the first active view 190-1, the Cache Manager 150 accesses the cache 430 to retrieve the images 216-1, 217-1 rather than sending additional requests for those images 216-1, 217-1 to the server 170.

The Cache Manager 150 detects selection of image 217-1 in the first active view 190-1. Such selection is an indication that the user desires to view a larger-sized version of the image 217-2. However, a larger-sized version of the image 217-2 is not locally stored in the cache 430. Thus, the Cache Manager 150 terminates displays of the larger-sized image 214-2 and requests the larger-sized version of image 217-2 from the image repository 410.

Upon termination of display of larger-sized mage 214-2, the reference counter 440 for the larger-sized mage 214-2 can be decremented to indicate that no active view is displaying the larger-sized image 214-2. However, in one embodiment, the Cache Manager 150 can delay decrementing the reference counter 440 for a period of time. As illustrated in FIG. 5, the Cache Manager 150 will not decrement the reference counter 440 until that period of time expires. Therefore, before the period of time expires, the reference counter 440 maintains the current value of 1—even though no active view currently displays the larger-sized image 214-2. In other embodiments, the reference counter 440 can be decremented immediately upon termination of display of the larger-sized image 214-2 in an active view.

As the Cache Manager 150 waits for receipt of the larger-sized version of the image 217-2, it again accesses the version of the image 217-1 that is already in the cache 430. Image 217-1 is again retrieved from the cache 430 and the Cache Manager 150 passes the image 217-1 through an image scaling function 420 in order to expand the image 217-1. Expanding the image 217-1 creates a scaled image 217-1-1. The Cache Manager displays the scaled image 217-1-1 along with the four images 214-1, 215-1, 216-1, 217-1 already displayed in the first active view 190-1.

Figure 6:
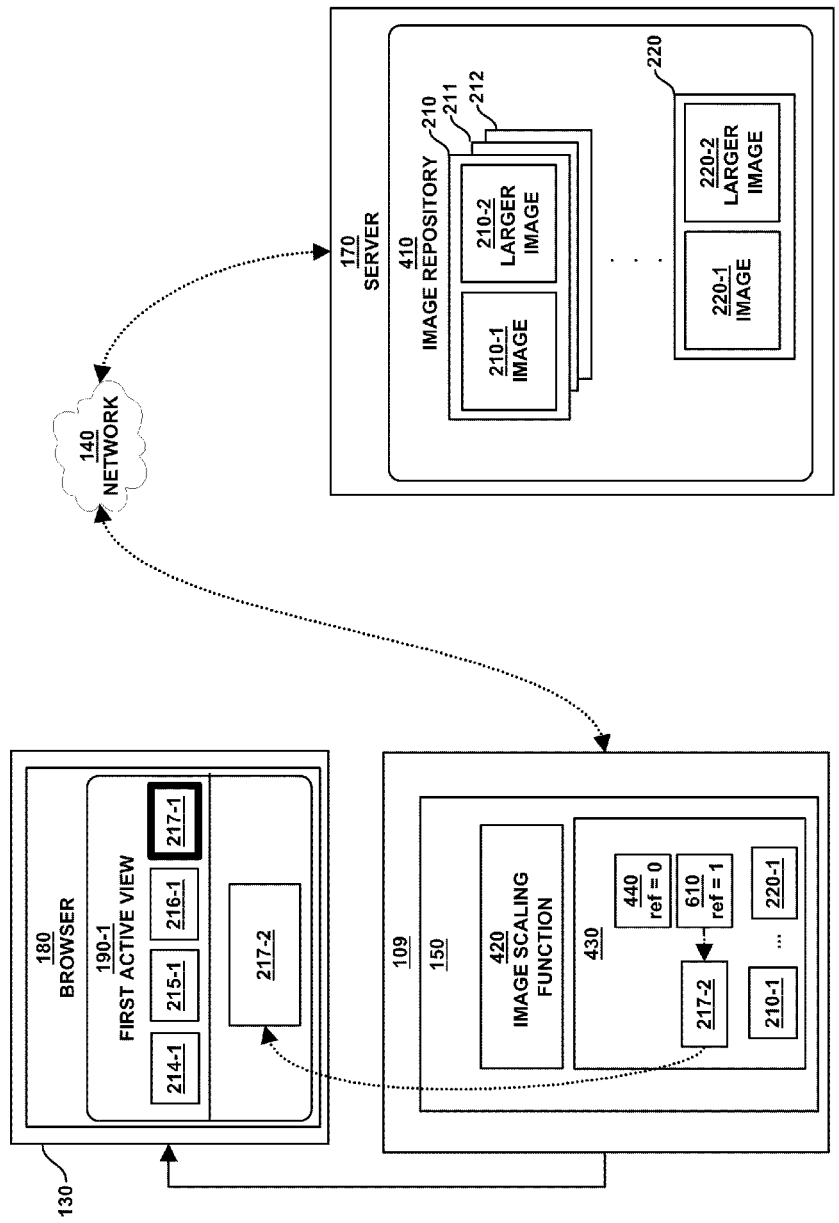
FIG. 6 is an example block diagram of Cache Manager refreshing the first active view to display another larger-sized image in place of another scaled image according to embodiments herein.

FIG. 6 is an example block diagram of Cache Manager refreshing the first active view 190-1 to display another larger-sized image 217-2 in place of another scaled image 217-1-1 according to embodiments herein.

When the larger-sized image 217-2 is received, the Cache Manager 150 stores the larger-sized image 217-2 in the cache 430 and associates a reference counter 610 with the larger-sized image 217-2. The reference counter 610 keeps track of the number of instances of display of the larger-sized image 217-2 by any active view.

The Cache Manager 150 refreshes the first active view 190-1 to display the larger-sized image 217-2 in place of the scaled image 217-1-1. Thus, the first active view concurrently displays the larger-sized image 217-2 with along with images 214-1, 215-1, 216-1, 217-1.

Since the refreshed first active view 190-1 displays the larger-sized image 217-2, the reference counter 610 is incremented to a current value of 1, thereby representing one instance of display of the larger-sized image 217-2 by an active view. The reference counter 440 associated with the larger-sized image 214-2 has a current value of 0, thereby representing that no active view displays the larger-sized mage 214-2.

Figure 7:
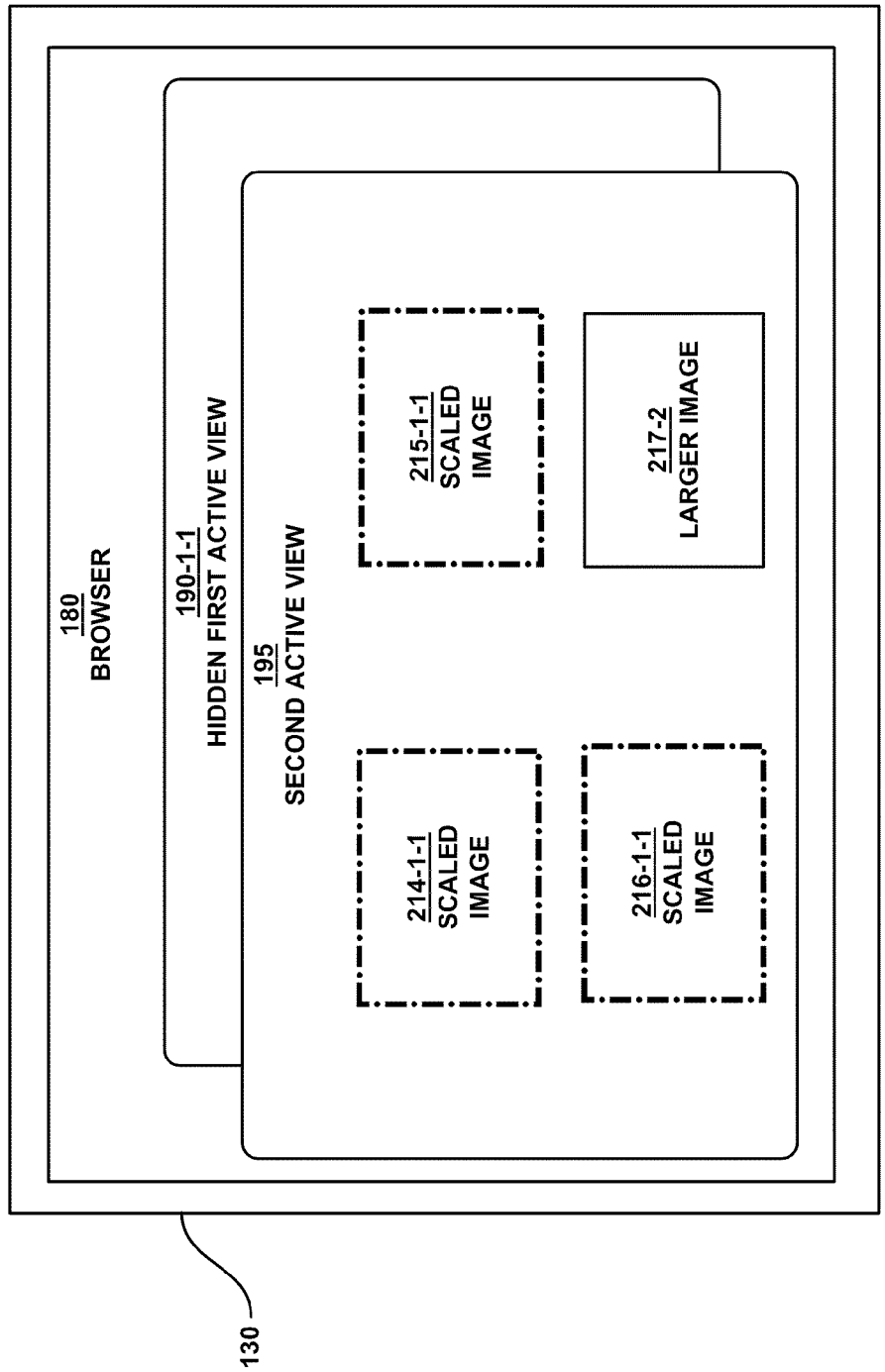
FIG. 7 is an example block diagram of Cache Manager rendering a second active view displaying a plurality of scaled images and a larger-sized image according to embodiments herein.

Continuing from the example illustrated in FIG. 6, FIG. 7 is an example block diagram of Cache Manager 150 rendering a second active view 195 displaying a plurality of scaled images 214-1-1, 215-1-1, 216-1-1 and a larger-sized image 217-2 according to embodiments herein.

In FIG. 7, the user can decide to render a second active view 195 of the images 214-1, 215-1, 216-1, 217-1 displayed by the first active view 190-1 in the browser 180. The Cache Manager 150 thereby hides (or partially hides) the first active view 190-1-1 and renders the second active view 195.

The second active view 195 requires each displayed image to be of a size larger than the size of the images in the locally stored collection of images 210-1 . . . 220-1. However, as shown in FIG. 6, the cache already has a large-sized image 217-2 in the cache 430 with an associated reference counter 610 having a current value of 1. The current value of the reference counter indicates that another active view, such as the hidden first active view 190-1-1, is displaying the larger-sized image 217-1.

Since the current value of the reference counter 610 is greater than 0, the second active view 195 can access the larger-sized image 217-2 in the cache 430 and display it. However, since larger-sized images 214-2, 215-2, 216-2 are not in cache 430, the Cache Manager 150 creates and displays scaled versions of the images 214-1-1, 215-1-1, 216-1-1 while it retrieves the larger-sized images 214-2, 215-2, 216-2 from the image repository 410.

Figure 8:
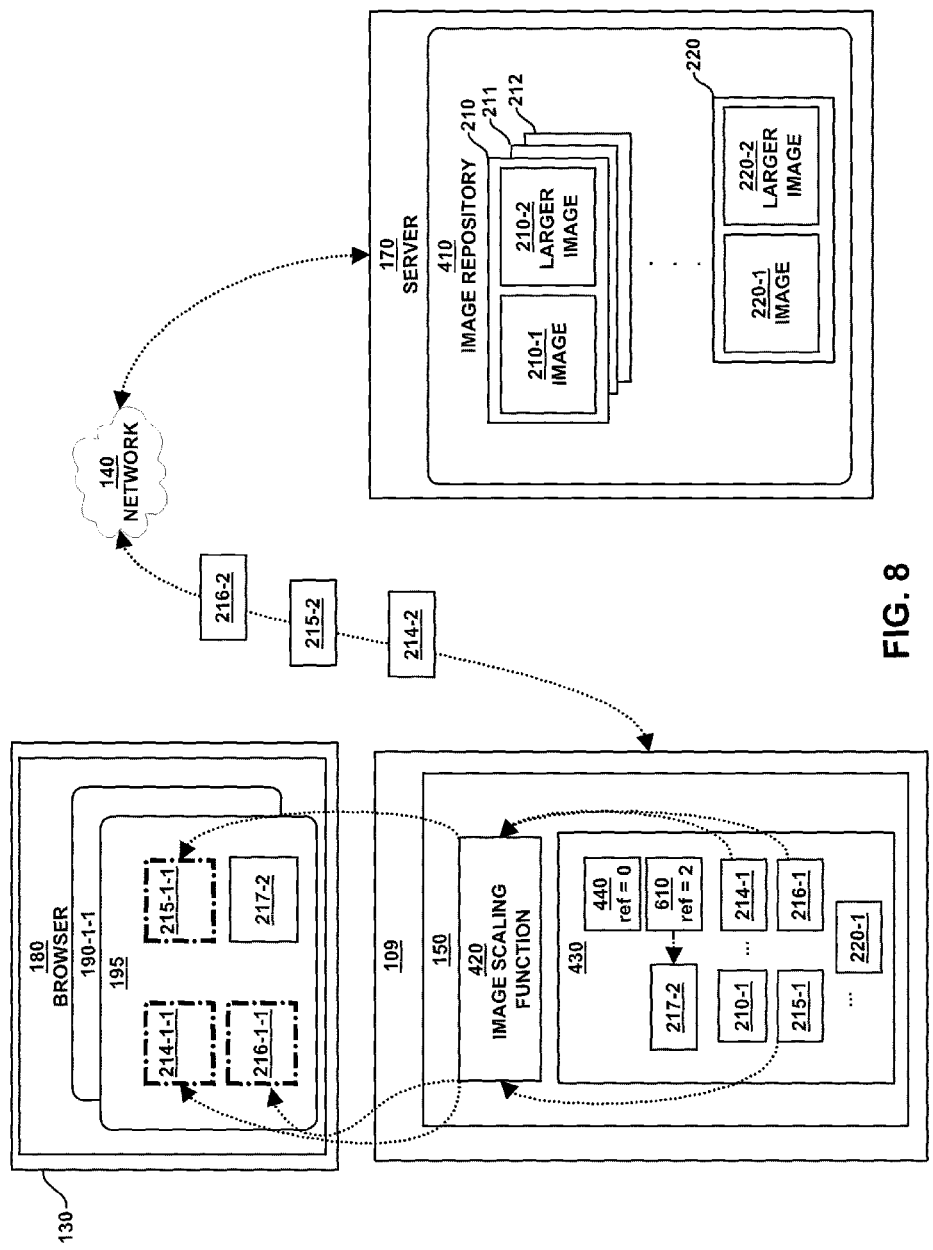
FIG. 8 is an example block diagram of a Cache Manager displaying a plurality of scaled images in the second active view while waiting for receipt of larger-sized images from an image repository according to embodiments herein.

FIG. 8 is an example block diagram of a Cache Manager 150 displaying a plurality of scaled images 214-1-1, 215-1-1, 216-1-1 in the second active view 195 while waiting for receipt of larger-sized images 214-2, 215-2, 216-2 from an image repository 410 according to embodiments herein.

The reference counter 440 associated with the larger-sized image 214-2 has a current value of 0, which means that the Cache Manager 150 must retrieve the larger-sized image 214-2 from the image repository, along with larger-sized images 215-2 and 216-2.

As the Cache Manager 150 waits for receipt of the larger-sized images 214-2, 215-2, 216-2, it again accesses the version of the images 214-1, 215-1, 216-1 that are already in the cache 430. The images 214-1, 215-1, 216-1 are retrieved from the cache 430 and the Cache Manager 150 passes the images 214-1, 215-1, 216-1 through an image scaling function 420 in order to expand the images 214-1, 215-1, 216-1. Expanding the images 214-1, 215-1, 216-1 creates scaled images 214-1-1, 215-1-1, 216-1-1. The Cache Manager displays the scaled images 214-1-1, 215-1-1, 216-1-1 until it receives the larger-sized images 214-2, 215-2, 216-2.

Figure 9:
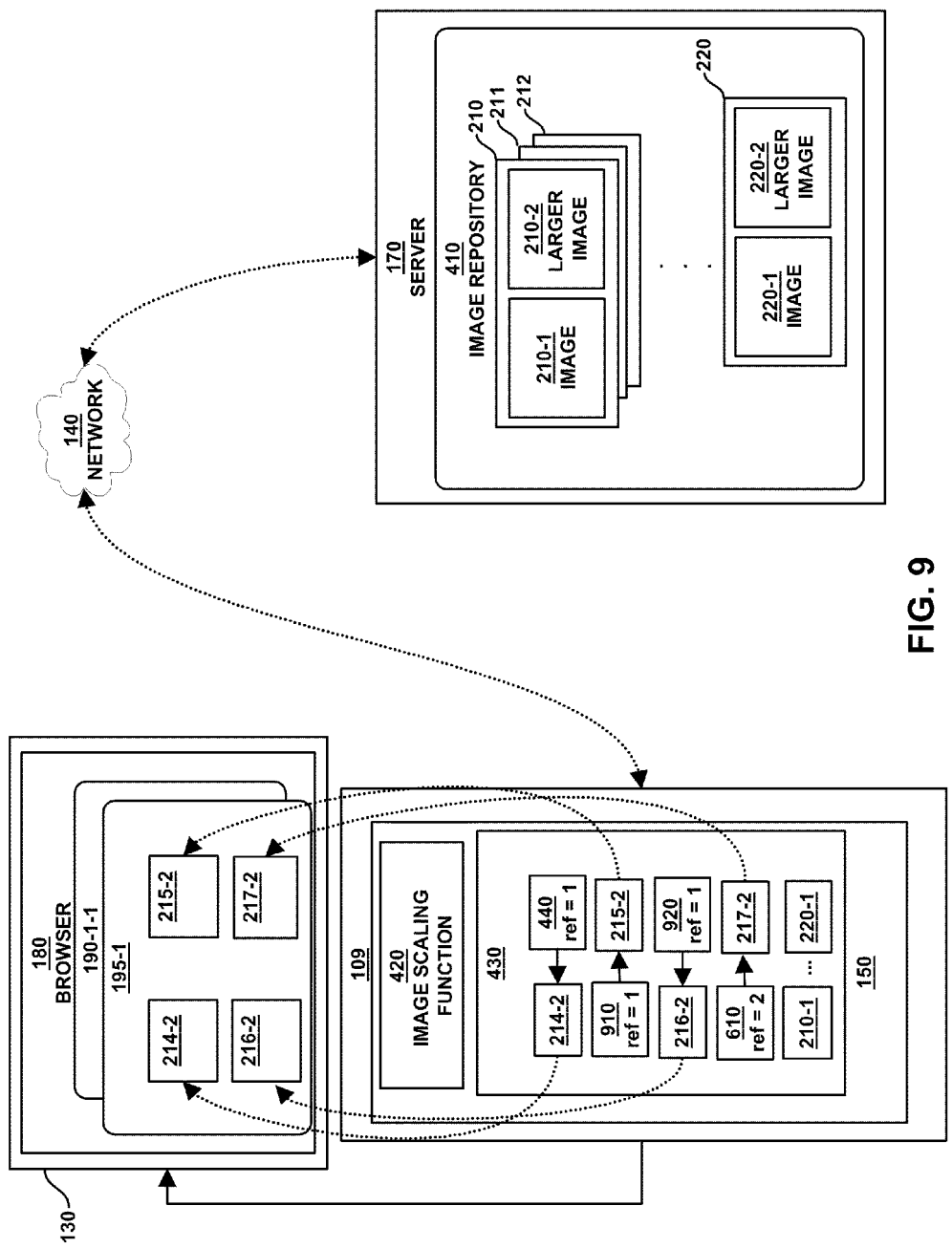
FIG. 9 is an example block diagram of Cache Manager displaying a plurality of larger-sized images in the second active view according to embodiments herein.

FIG. 9 is an example block diagram of Cache Manager 150 displaying a plurality of larger-sized images 214-2, 215-2, 216-2 in the second active view 195-1 according to embodiments herein.

The reference counter 610 associated with the larger-sized image 217-2 has a current value of 2 since it is displayed by two active views—the second active view 195-1 and the hidden (or partially hidden) first active view 190-1-1.

When the larger-sized versions of images 214-2, 215-2, 216-2 are received from the image repository 410, the larger-sized versions of the three images 214-2, 215-2, 216-2 are locally stored in the cache 430. Each larger-sized version of the three images 214-2, 215-2, 216-2 has its own associated reference counter 440, 910, 920.

The Cache Manager 150 refreshes the second active view 195-1 to display the three larger-sized images 214-2, 215-2, 216-2 in place of the scaled versions of the three images 214-1-1, 215-1-1, 216-1-1. Based on display of the larger-sized image 214-2 in the second active view 195-1, the reference counter 440 associated with the larger-sized image 214-2 is incremented to a current value of 1. Based on display of the larger-sized image 215-2 in the second active view 195-1, the reference counter 910 associated with the larger-sized image 215-2 is incremented to a current value of 1. Additionally, the reference counter 920 associated with the larger-sized image 216-2 is also incremented to a current value of 1 once it is displayed in the second active view 195-1.

Figure 10:
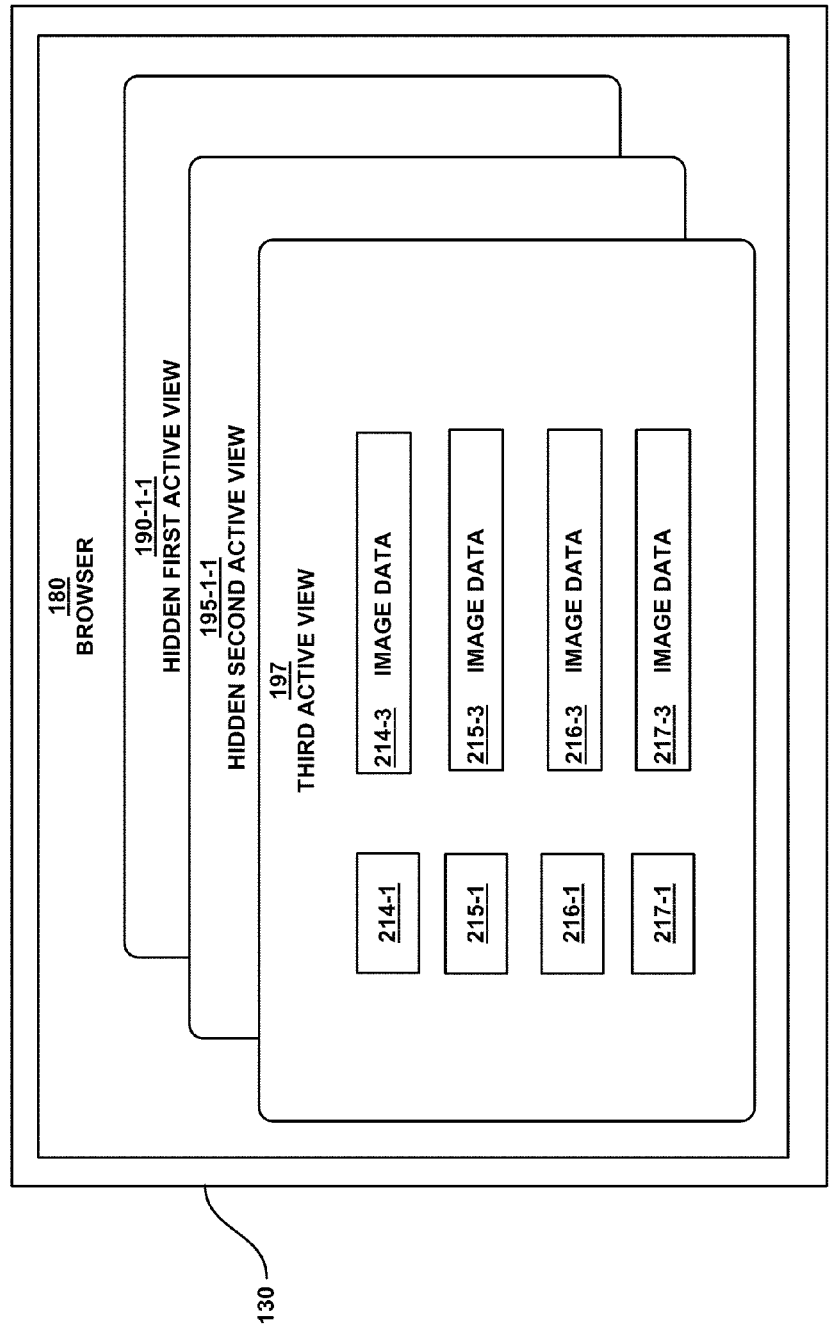
FIG. 10 is an example block diagram of a Cache Manager rendering a third active view and hiding second active view and the first active view in a user interface according to embodiments herein.

FIG. 10 is an example block diagram of a Cache Manager 150 rendering a third active view 197 and hiding (or partially hiding) the second active view 195-1-1 and the first active view 190-1-1 in a user interface (e.g. a browser 180) according to embodiments herein.

The user can again choose to view the images 214-2 . . . 217-2 displayed in the second active view 195 in another active view. For example, the Cache Manager 150 provides for a third active view that displays thumbnails of images along with image data.

The third active view 197 utilizes the images 214-1, 215-1, 216-1, 217-1 in the locally stored collection of images 210-1 . . . 220-1 for thumbnails displayed along with corresponding image data 214-3, 215-3, 216-3, 217-3. Thus, the third active view 197 does not need to access and display the four larger-sized images 214-2, 215-2, 216-2, 217-2 already in the cache 430, as shown in FIG. 9.

However, the reference counters 440, 610, 910, 920 for the four larger-sized images 214-2, 215-2, 216-2, 217-2 are not decremented because the larger-sized images 214-2, 215-2, 216-2, 217-2 are still displayed in the hidden second active view 195-1-1, and the larger-sized image 217-2 is still displayed in the hidden first active 190-1-1 as well.

Figure 11:
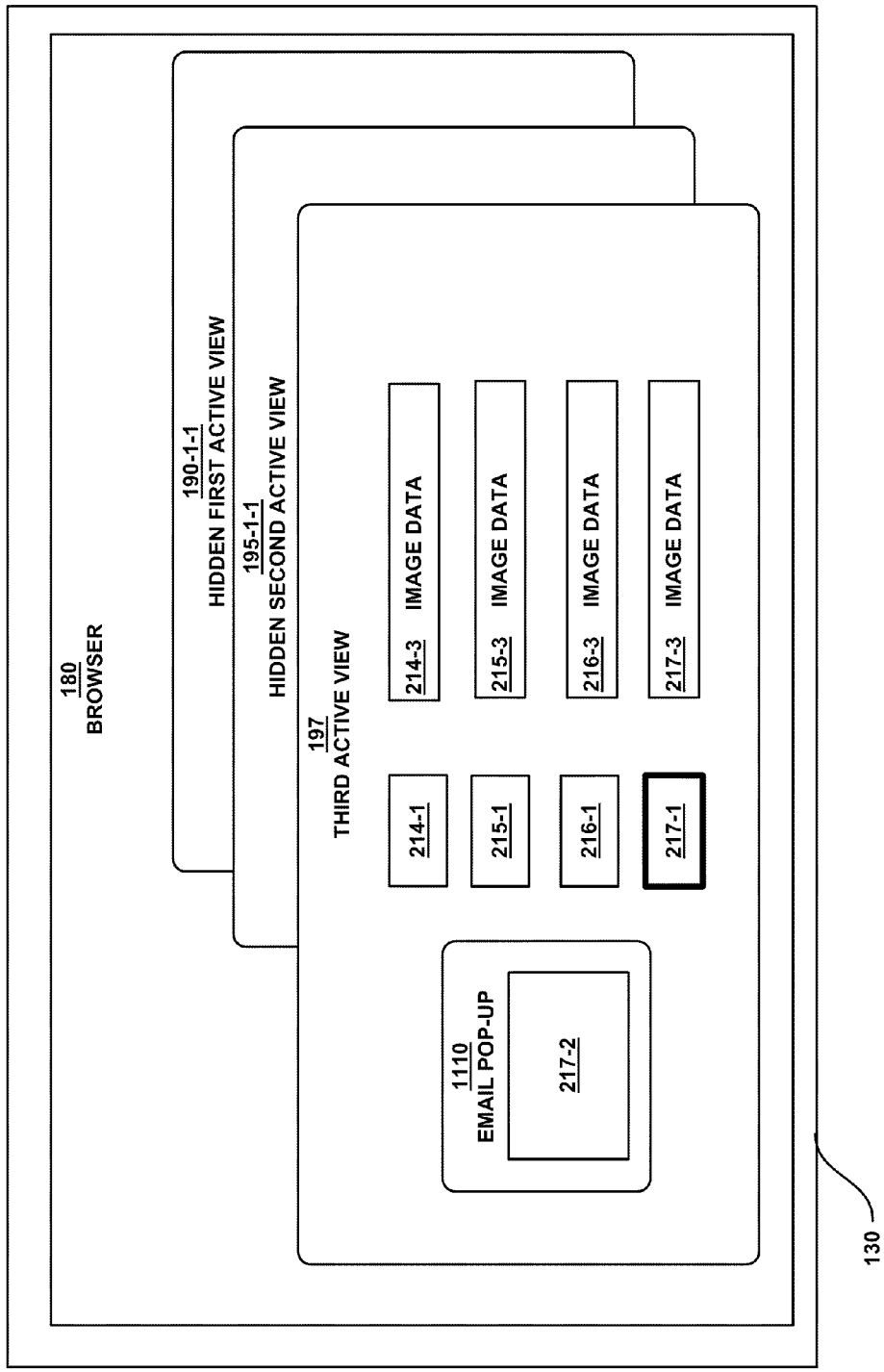
FIG. 11 is an example block diagram of larger-sized image displayed in a pop-up window of the third active view in a user interface according to embodiments herein.

FIG. 11 is an example block diagram of larger-sized image 217-2 displayed in a pop-up window 1110 of the third active view 197 in a user interface (e.g. a browser 180) according to embodiments herein.

The Cache Manager 150 allows the user to email an image. Once the user selects the image 217-1 to be emailed, an email pop-up window 1110 appears. The email pop-up window 1110 provides the user a text box to enter a recipient's email address along with a message. In addition, the Cache Manager 150 displays a larger-sized image 217-2 of the image 217-1 that the user selected to be emailed.

As shown in FIG. 9, the cache 430 already has a large-sized image 217-2 with an associated reference counter 610 having a current value of 2. The current value of the reference counter 610 indicates that two other active views, such as the hidden first and second active views 190-1-1, 195-1-1 are displaying the larger-sized image 217-2.

Since the current value of the reference counter 610 is greater than 0, the third active view 197 can access the larger-sized image 217-2 in the cache 430 and display it in the email pop-up window 1110 without having to request the larger-sized image 217-2 from the image repository 410. As the larger-sized image 217-2 is displayed in the email pop-up window 1110, the reference counter 610 associated with the larger-sized image 217-2 is incremented to a current value of 3—thereby indicating that the Cache Manager 150 displays the larger-sized image 217-2 in three active views: the third active view 197, the hidden second active view 195-1-1, and the hidden first active view 190-1-1.

FIG. 12 through FIG. 15 illustrate various embodiment of the Cache Manager 150. The rectangular elements in flowcharts 1200, 1300, 1400 and 1500 denote processing blocks and represent computer software instructions or groups of instructions upon a computer readable medium. Additionally, the processing blocks represent steps performed by hardware such as a computer, digital signal processor circuit, application specific integrated circuit (ASIC), etc.

Flowcharts 1200, 1300, 1400 and 1500 do not necessarily depict the syntax of any particular programming language. Rather, flowcharts 1200, 1300, 1400 and 1500 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 12:
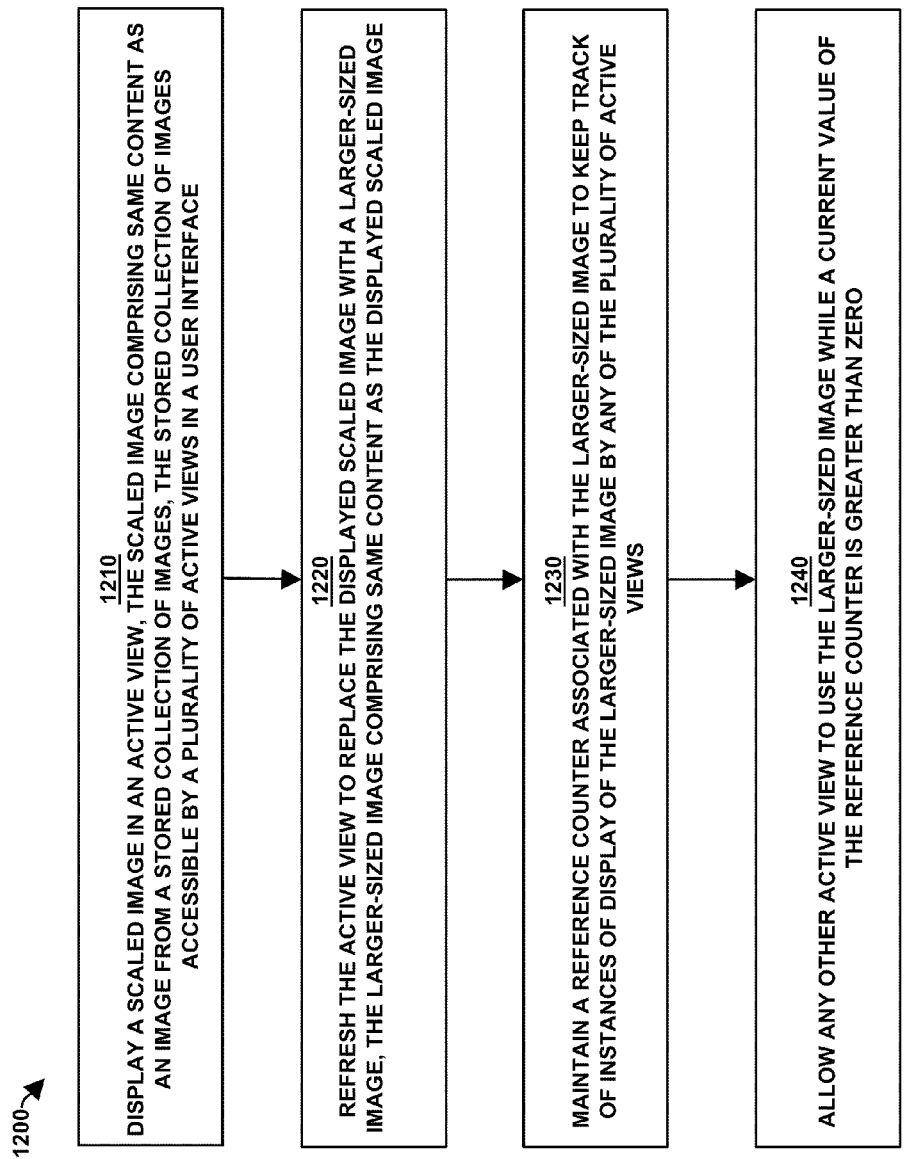
FIG. 12 is a flowchart of an example of processing steps performed by the Cache Manager to refresh an active view with a larger-sized image according to embodiments herein.

FIG. 12 is a flowchart 1200 of an example of processing steps performed by the Cache Manager 150 to refresh an active view 190 with a larger-sized image 214-2 according to embodiments herein.

At step 1210, the Cache Manager 150 displays a scaled image 214-1-1 in an active view 190. The scaled image 214-1-1 comprises same content 214 as an image 214-1 from a stored collection of images 210-1 . . . 220-1. The stored collection of images 210-1 . . . 220-1 is accessible by a plurality of active views 190, 195, 197 in a user interface, such as a browser 180.

For example, upon detecting a condition (such as a user clicking on the displayed image 214-1 in a first active view 190) to display the image 214-1 from the stored collection of images 210-1 . . . 220-1 in a larger size 214-2, the Cache Manager 150 determines whether the larger-sized image 214-2 is available in local storage, such as a cache 430.

Upon determining the larger-sized image 214-2 is unavailable in local storage (i.e. cache 430), the Cache Manager 150 expands the image 214-1 to a larger size to create a scaled image 214-1-1 via a scaling function 420. In addition, the Cache Manager 150 sends a request for the larger-sized image 214-2 to an image repository 410.

The Cache Manager 150 displays the scaled image 214-1-1 in the first active view 190 while awaiting receipt of the larger-sized image 190. When the Cache Manager 150 receives the larger-sized image 214-2, the Cache Manager 150 locally stores the larger-sized image 214-2 in the cache 430 and provides the first active view 190 access to the larger-sized image 214-2 for display in the first active view 190 in place of the scaled image 214-1-1—currently displayed in the first active view 190.

At step 1220, the Cache Manager 150 refreshes the first active view 190 to replace the displayed scaled image 214-1-1 with the larger-sized image 214-2. It is understood that the larger-sized image 214-2 comprises the same content 214 as the displayed scaled image 214-1-1.

At step 1230, the Cache Manager 150 maintains a reference counter 440 associated with the larger-sized image 214-2 to keep track of instances of display of the larger-sized image 214-2 by any of the plurality of active views, such as first active view 190.

At step 1240, the Cache Manager 150 allows any other active views 195, 197 to use the larger-sized image 214-2 while a current value of the reference counter 440 is greater than zero.

Figure 13:
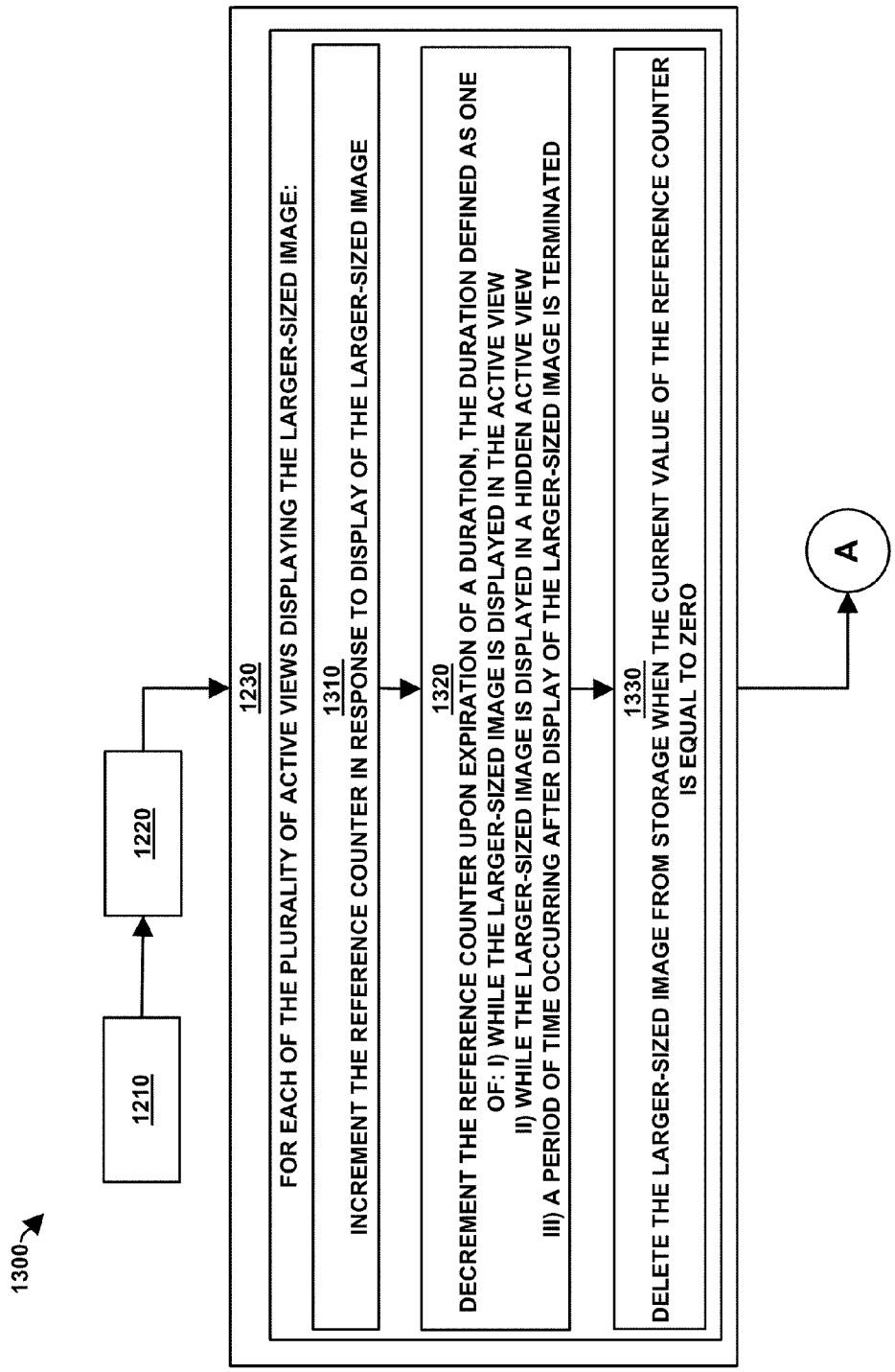
FIG. 13 is a flowchart of an example of processing steps performed by the Cache Manager to increment and decrement a reference counter according to embodiments herein.
Figure 14:
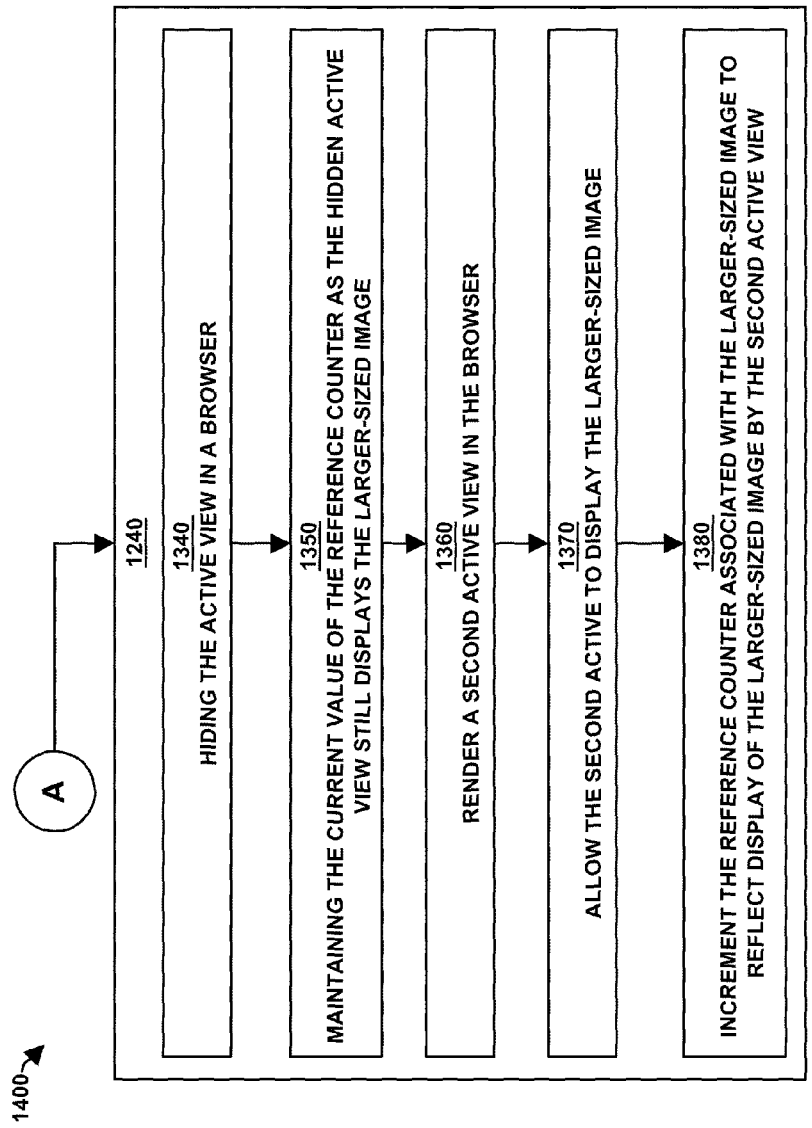
FIG. 14 is a flowchart of an example of processing steps performed by the Cache Manager to render a second active view and hide an active view according to embodiments herein.

FIGS. 13-14 are flowcharts 1300, 1400 of an example of processing steps performed by the Cache Manager 150 to increment and decrement a reference counter 440 and to render a second active view 195 according to embodiments herein.

For each of the plurality of active views (such as first active view 190) displaying the larger-sized image 214-2, at step 1310, the Cache Manager 150 increments the reference counter 440 in response to display of the larger-sized image 214-2.

At step 1320, the Cache Manager 150 decrements the reference counter 214-2 upon expiration of a duration. The Cache Manager 150 defines the duration as (i) the amount of time the larger-sized image 214-2 is displayed in the active view 190, 195, 197, ii) the amount of time the larger-sized image 214-2 is displayed in a hidden active view 190-1-1, 195-1-1, or iii) a period of time that occurs after display of the larger-sized image 214-2 is terminated.

After expiration of the duration, at step 1330, the Cache Manager 150 deletes the larger-sized image 214-2 from storage (i.e. the cache 430) when the current value of the reference counter 440 is equal to zero.

Turning now to FIG. 14, in order to allow another active view use of a locally stored larger-sized image, at step 1340, the Cache Manager 150 hides the first active view 190-1-1 in a browser 180.

At step 1350, the Cache Manager 150 maintains the current value of the reference counter 610 as the hidden first active view 190-1-1 still displays the larger-sized image 217-2.

At step 1360, the Cache Manager 150 renders a second active view 195 in the browser 180.

At step 1370, the Cache Manager 150 allows the second active view 195 to display the larger-sized image 217-2 because the current value of the reference counter 610 associated with the larger-sized image 217-2 is greater than zero.

At step 1380, the Cache Manager 150 increments the reference counter 610 associated with the larger-sized image 217-2 to reflect display of the larger-sized image 217-2 by the second active view 195.

Figure 15:
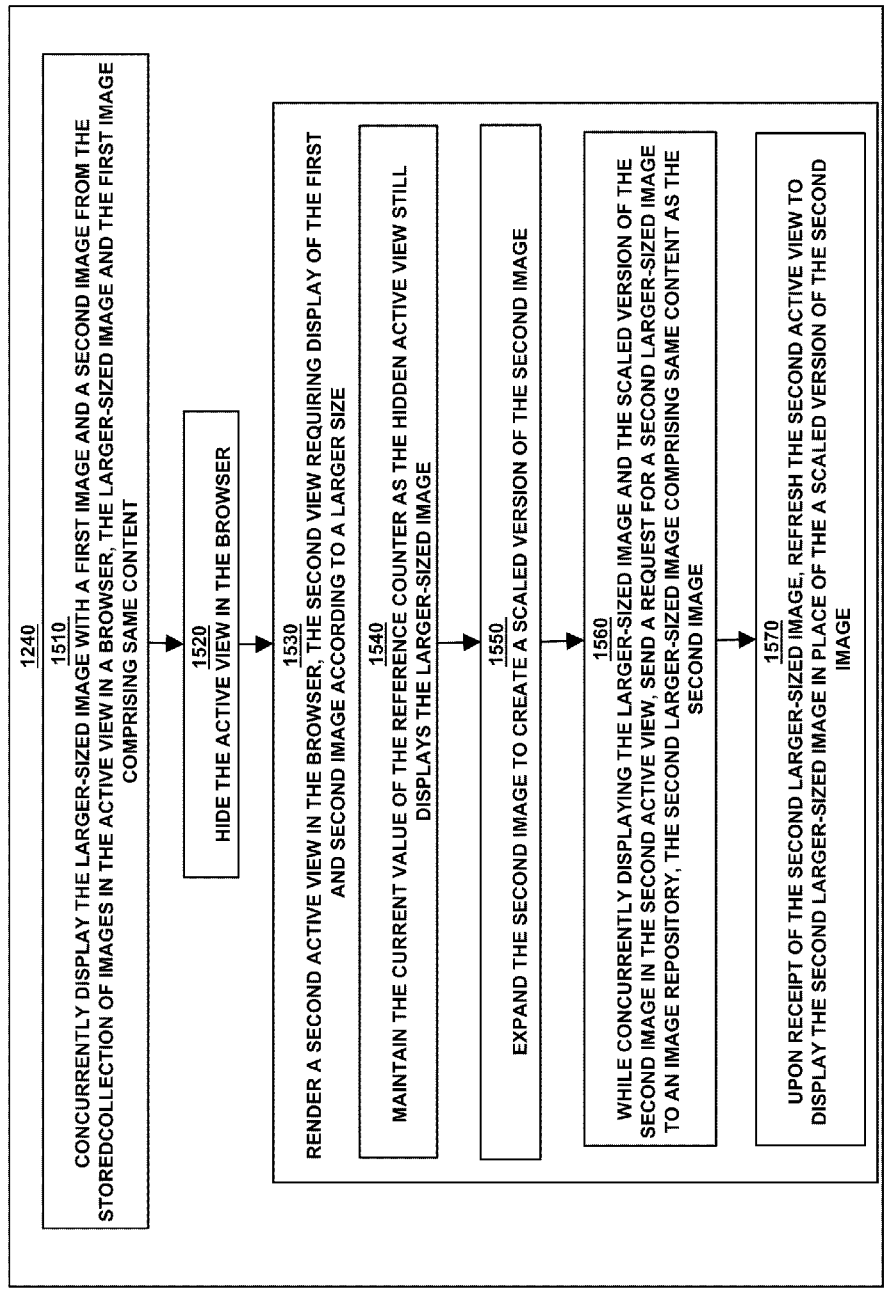
FIG. 15 is a flowchart of an example of processing steps performed by the Cache Manager to render the second active view in a browser according to embodiments herein.

FIG. 15 is a flowchart 1500 of an example of processing steps performed by the Cache Manager 150 to render the second active view 195 in a browser 180 according to embodiments herein.

At step 1510, the Cache Manager 150 concurrently displays the larger-sized image 217-2 with a first image 217-1 and a second image 216-1 from the stored collection of images 210-1 . . . 220-1 in the first active view 190-1 in a browser 180. It is understood that the larger-sized image 217-2 and the first image 217-1 comprises the same content 217.

At step 1520, the Cache Manager 150 hides the first active view 190-1-1 in the browser 180.

At step 1530, the Cache Manager 150 renders a second active view 195 in the browser 180. The second view 195 requires display of the first and second image 217-1, 216-1 according to a larger size.

At step 1540, the Cache Manager 150 maintains the current value of the reference counter 610 as the hidden first active view 190-1-1 still displays the larger-sized image 217-2.

At step 1550, the Cache Manager 150 expands the second image 216-1 to create a scaled version of the second image 216-1-1.

At step 1560, while concurrently displaying the larger-sized image 217-2 and the scaled version of the second image 216-1-1 in the second active view 195, the Cache Manager 150 sends a request for a second larger-sized image 216-2 to an image repository 410. The second larger-sized image 216-2 comprises same content 216 as the second image 216-1 and the displayed scaled image 216-1-1.

For example, in one embodiment, the Cache Manager 150 detects the reference counter 920 associated with the larger-sized image 216-2 is equal to zero, thereby indicating that no active view and no hidden active view has recently displayed the larger-sized image 216-2.

In response to detecting the reference counter 920 associated with the larger-sized image 216-2 is equal to zero, the Cache Manager 150 sends a request for the larger-sized image 216-2 to an image repository 410.

At step 1570, upon receipt of the second larger-sized image 216-2, the Cache Manager 150 refreshes the second active view 195 to display the second larger-sized image 216-2 in place of the a scaled version of the second image 216-1-1.

The Cache Manager 150 increments the reference counter 610 associated with larger-sized image 217-2 in response to display of the larger-sized image 217-2 in the second active view 195. The reference counter 610 thereby reflects display of the larger-sized image 217-2 in the hidden first active view 190-1-1 and the second active view 195. The Cache Manager 150 increments a second reference counter 920 associated with the second larger-sized image 216-2 in response to display of the second larger-sized image 216-2 in the second active view 195.

Note again that techniques herein are well suited for a Cache Manager 150 that allows for a Cache Manager 150 that stores a reference 440 to a stored image 214-2 currently displayed in an active view 190. When the active view 190 terminates display of the image 214-2, the reference 440 is deleted (or decremented) and the image 214-2 is removed from storage. However, while the reference 440 exists in storage (or is greater than zero), other active views 194, 197 can utilize the same stored image 214-2. Hence, the Cache Manager 150 allows for multiple active views 190, 195, 197 to access the stored image 214-2 while avoiding the processing costs associated with managing time stamps.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer (s), workstation(s) (e.g., Sun, HP), personal digital assistant (s) (PDA(s)), handheld device(s) such as cellular telephone (s), laptop(s), handheld computer(s), or another device(s) capable of being integrated with a processor(s) that may operate as provided herein. Accordingly, the devices provided herein are not exhaustive and are provided for illustration and not limitation.

References to a processor, or the processor, may be understood to include one or more microprocessors that may communicate in a stand-alone and/or a distributed environment (s), and may thus be configured to communicate via wired or wireless communications with other processors, where such one or more processor may be configured to operate on one or more processor-controlled devices that may be similar or different devices. Use of such processor terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application.

References to a network, unless provided otherwise, may include one or more intranets and/or the internet, as well as a virtual network.

Throughout the entirety of the present disclosure, use of the articles a or an to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method, comprising:
   displaying a scaled image in an active view, the scaled image comprising same content as an image from a stored collection of images, the stored collection of images accessible by a plurality of active views in a user interface;

refreshing the active view to replace the displayed scaled image with a larger-sized image, the larger-sized image comprising same content as the displayed scaled image;

maintaining a reference counter associated with the larger-sized image to keep track of instances of display of the larger-sized image by any of the plurality of active views; and allowing any other active view to use the larger-sized image while a current value of the reference counter is greater than zero.

2. The method as in claim 1, wherein maintaining the reference counter associated with the larger-sized image to reflect display of the larger-sized image by any of the plurality of active views includes:

for each of the plurality of active views displaying the larger-sized image:
incrementing the reference counter in response to display of the larger-sized image;
decrementing the reference counter upon expiration of a duration, the duration defined as one of:
i) while the larger-sized image is displayed in the active view;
ii) while the larger-sized image is displayed in a hidden active view;
iii) a period of time occurring after display of the larger-sized image is terminated; and
deleting the larger-sized image from storage when the current value of the reference counter is equal to zero.

3. The method as in claim 2, wherein allowing any other active view to use the larger-sized image while the current value of the reference counter is greater than zero includes:
hiding at least a portion of the active view in a browser;
maintaining the current value of the reference counter as the hidden active view still displays the larger-sized image;
rendering a second active view in the browser;
allowing the second active view to display the larger-sized image; and
incrementing the reference counter associated with the larger-sized image to reflect display of the larger-sized image by the second active view.

4. The method as in claim 1, wherein displaying the scaled image in an active view, includes:
upon detecting a condition to display the image from the stored collection of images in a larger size, determining whether the larger-sized image is available in local storage;
upon determining the larger-sized image is unavailable in local storage:
expanding the image to the larger size to create the scaled image;
sending a request for the larger-sized image to an image repository;
displaying the scaled image in the active view while awaiting receipt of the larger-sized image;
receiving the larger-sized image;
locally storing the larger-sized image; and
providing the active view access to the larger-sized image for display in the active view in place of the scaled image currently displayed in the active view.

5. The method as in claim 1, wherein allowing any other active view to use the larger-sized image while the current value of the reference counter is greater than zero includes:

concurrently displaying the larger-sized image with a first image and a second image from the stored collection of images in the active view in a browser, the larger-sized image and the first image comprising same content;
hiding the active view in the browser; and
rendering a second active view in the browser, the second view requiring display of the first and second image according to a larger size.

6. The method as in claim 5, wherein rendering the second active view includes:
maintaining the current value of the reference counter as the hidden active view still displays the larger-sized image;
expanding the second image to create a scaled version of the second image;
while concurrently displaying the larger-sized image and the scaled version of the second image in the second active view, sending a request for a second larger-sized image to an image repository, the second larger-sized image comprising same content as the second image; and
upon receipt of the second larger-sized image, refreshing the second active view to display the second larger-sized image in place of the a scaled version of the second image.

7. The method as in claim 6, wherein maintaining the reference counter associated with the larger-sized image to keep track of instances of display of the larger-sized image by any of the plurality of active views includes:
incrementing the reference counter associated with larger-sized image in response to display of the larger-sized image in the second active view, the reference counter associated with the larger-sized image thereby reflecting display of the larger-sized image in the hidden first active view and the second active view; and
incrementing a second reference counter associated with the second larger-sized image in response to display of the second larger-sized image in the second active view.

8. The method as in claim 1, wherein displaying the scaled image in the active view includes:
detecting the reference counter associated with the larger-sized image is equal to zero, thereby indicating that no active view and no hidden active view has recently displayed the larger-sized image; and
in response to detecting the reference counter associated with the larger-sized image is equal to zero, sending a request for the larger-sized image to an image repository.

9. The method as in claim 1, wherein maintaining the reference counter associated with the larger-sized image to keep track of instances of display of the larger-sized image by any of the plurality of active views includes:
upon a termination of display of the larger-sized image by any of the plurality of active views, maintaining the current value of the reference counter for a period of time; and
upon expiration of the period of time, decrementing the reference counter to reflect the termination of display.

10. The method as in claim 9, decrementing the reference counter to reflect the termination of display includes:
upon determining that the reference counter associated with the larger-sized image is equal to zero, initiating deletion of the larger-sized image from local storage.

11. A computer readable medium comprising executable instructions encoded thereon operable on a computerized device to perform processing comprising:

instructions for displaying a scaled image in an active view, the scaled image comprising same content as an image from a stored collection of images, the stored collection of images accessible by a plurality of active views in a user interface;

instructions for refreshing the active view to replace the displayed scaled image with a larger-sized image, the larger-sized image comprising same content as the displayed scaled image;

instructions for maintaining a reference counter associated with the larger-sized image to reflect display of the larger-sized image by any of the plurality of active views; and instructions for allowing any other active view to use the larger-sized image while a current value of the reference counter is greater than zero.

12. The computer readable medium as in claim 11, wherein the instructions for maintaining the reference counter associated with the larger-sized image to reflect display of the larger-sized image by any of the plurality of active views include:

for each of the plurality of active views displaying the larger-sized image:
instructions for incrementing the reference counter in response to display of the larger-sized image;
instructions for decrementing the reference counter upon expiration of a duration, the duration defined as one of:
i) while the larger-sized image is displayed in the active view;
ii) while the larger-sized image is displayed in a hidden active view;
iii) a period of time occurring after display of the larger-sized image is terminated; and
instructions for deleting the larger-sized image from storage when the current value of the reference counter is equal to zero.

13. The computer readable medium as in claim 12, wherein the instructions for allowing any other active view to use the larger-sized image while the current value of the reference counter is greater than zero include:

instructions for hiding at least a portion of the active view in a browser;
instructions for maintaining the current value of the reference counter as the hidden active view still displays the larger-sized image;
instructions for rendering a second active view in the browser;
instructions for allowing the second active view to display the larger-sized image; and
instructions for incrementing the reference counter associated with the larger-sized image to reflect display of the larger-sized image by the second active view.

14. The computer readable medium as in claim 11, wherein the instructions for displaying the scaled image in an active view include:

upon detecting a condition to display the image from the stored collection of images in a larger size, instructions for determining whether the larger-sized image is available in local storage;
upon determining the larger-sized image is unavailable in local storage:
instructions for expanding the image to the larger size to create the scaled image;
instructions for sending a request for the larger-sized image to an image repository;
instructions for displaying the scaled image in the active view while awaiting receipt of the larger-sized image;
instructions for receiving the larger-sized image;
instructions for locally storing the larger-sized image; and
instructions for providing the active view access to the larger-sized image for display in the active view in place of the scaled image currently displayed in the active view.

15. The computer readable medium as in claim 11, wherein the instructions for allowing any other active view to use the larger-sized image while the current value of the reference counter is greater than zero include:

instructions for concurrently displaying the larger-sized image with a first image and a second image from the stored collection of images in the active view in a browser, the larger-sized image and the first image comprising same content;
instructions for hiding the active view in the browser; and
instructions for rendering a second active view in the browser, the second view requiring display of the first and second image according to a larger size.

16. The computer readable medium as in claim 15, wherein the instructions for rendering the second active view include:

instructions for maintaining the current value of the reference counter as the hidden active view still displays the larger-sized image;
instructions for expanding the second image to create a scaled version of the second image;
while concurrently displaying the larger-sized image and the scaled version of the second image in the second active view, instructions for sending a request for a second larger-sized image to an image repository, the second larger-sized image comprising same content as the second image; and
upon receipt of the second larger-sized image, instructions for refreshing the second active view to display the second larger-sized image in place of the a scaled version of the second image.

17. The computer readable medium as in claim 16, wherein the instructions for maintaining the reference counter associated with the larger-sized image to keep track of instances of display of the larger-sized image by any of the plurality of active views include:

instructions for incrementing the reference counter associated with larger-sized image in response to display of the larger-sized image in the second active view, the reference counter associated with the larger-sized image thereby reflecting display of the larger-sized image in the hidden first active view and the second active view; and
instructions for incrementing a second reference counter associated with the second larger-sized image in response to display of the second larger-sized image in the second active view.

18. The computer readable medium as in claim 11, wherein the instructions for displaying the scaled image in the active view include:

instructions for detecting the reference counter associated with the larger-sized image is equal to zero, thereby indicating that no active view and no hidden active view has recently displayed the larger-sized image; and
in response to detecting the reference counter associated with the larger-sized image is equal to zero; instructions for sending a request for the larger-sized image to an image repository.

19. The computer readable medium as in claim 11, wherein the instructions for maintaining the reference counter associated with the larger-sized image to keep track of instances of display of the larger-sized image by any of the plurality of active views include:
   upon a termination of display of the larger-sized image by any of the plurality of active views, instructions for maintaining the current value of the reference counter for a period of time; and
   upon expiration of the period of time, instructions for decrementing the reference counter to reflect the termination of display.

20. A computer system comprising:
   a processor;
   a memory unit that stores instructions associated with an application executed by the processor; and
   an interconnect coupling the processor and the memory unit, enabling the computer system to execute the application and perform operations of:
      displaying a scaled image in an active view, the scaled image comprising same content as an image from a stored collection of images, the stored collection of images accessible by a plurality of active views in a user interface;
      refreshing the active view to replace the displayed scaled image with a larger-sized image, the larger-sized image comprising same content as the displayed scaled image;
      maintaining a reference counter associated with the larger-sized image to reflect display of the larger-sized image by any of the plurality of active views; and
      allowing any other active view to display the larger-sized image while a current value of the reference counter is greater than zero.

* * * * *